US008119007B2

(12) United States Patent
Bajpayee et al.

(10) Patent No.: US 8,119,007 B2
(45) Date of Patent: Feb. 21, 2012

(54) WATER DESALINATION USING DIRECTIONAL SOLVENT EXTRACTION

(75) Inventors: Anurag Bajpayee, Cambridge, MA (US); Daniel Kraemer, Cambridge, MA (US); Andrew Jerome Muto, Cambridge, MA (US); Gang Chen, Carlisle, MA (US); John H. Lienhard, Lexington, MA (US); Borivoje B. Mikic, Charlestown, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 12/950,504

(22) Filed: Nov. 19, 2010

(65) Prior Publication Data

US 2011/0108481 A1 May 12, 2011

Related U.S. Application Data

(60) Provisional application No. 61/264,270, filed on Nov. 25, 2009.

(51) Int. Cl.
*B01D 11/04* (2006.01)
*B01D 11/00* (2006.01)
*C02F 1/26* (2006.01)

(52) U.S. Cl. ........................................ 210/642; 210/634
(58) Field of Classification Search ........................ None
See application file for complete search history.

(56) References Cited

U.S. PATENT DOCUMENTS

| 3,088,909 | A | | 5/1963 | Davison et al. |
| 3,177,139 | A | | 4/1965 | Kimberlin, Jr. et al. |
| 3,314,882 | A | * | 4/1967 | Schroeder ..................... 210/642 |
| 3,350,300 | A | | 10/1967 | Hess et al. |
| 3,408,290 | A | | 10/1968 | Scheibel |
| 3,823,000 | A | | 7/1974 | Johnson |
| 3,966,583 | A | * | 6/1976 | Cramer ......................... 208/404 |
| 3,983,032 | A | | 9/1976 | Hess et al. |
| 4,141,825 | A | * | 2/1979 | Conger ......................... 210/638 |
| 4,261,818 | A | | 4/1981 | Sweeney |
| 5,679,254 | A | * | 10/1997 | Chakrabarti .................. 210/642 |

FOREIGN PATENT DOCUMENTS

WO    WO 2006/029452 A1    3/2006

OTHER PUBLICATIONS

Benavides et al. "Extraction and purification of bioproducts and nanoparticles using aqueous two-phase systems strategies", Chem. Eng. Technol., vol. 31, No. 6 (2008) p. 838-845.*
European Patent Office, International Search Report and Written Opinion, PCT Application No. US2010/057448 (Mar. 16, 2011).
He, Mingyan, et al., "Concentrating Solutes and Nanoparticles within Individual Aqueous Microdroplets", *Analytical Chemistry*, vol. 76, No. 5, Mar. 1, 2004, pp. 1222-1227.
Hilder, M. H., "The Solubility of Water in Edible Oils and Fats", *Journal of the American Oil Chemists' Society*, vol. 45, No. 10, 1968, pp. 703-707.
Hoerr, C. W., et al., "The Effect of Water on the Solidification Points of Fatty Acids. Solubility of Water in Fatty Acids", *Oil & Soap*, vol. 19, No. 7, 1942, pp. 126-128.

* cited by examiner

*Primary Examiner* — Krishnan S Menon
*Assistant Examiner* — Katherine Zalasky
(74) *Attorney, Agent, or Firm* — Modern Times Legal; Robert J. Sayre

(57) ABSTRACT

Substantially pure water is produced via desalination using a directional solvent that directionally dissolves water but does not dissolve salt. The directional solvent is heated to dissolve water from the salt solution into the directional solvent. The remaining highly concentrated salt water is removed, and the solution of directional solvent and water is cooled to precipitate substantially pure water out of the solution.

20 Claims, 9 Drawing Sheets

WATER DESALINATION USING DIRECTIONAL SOLVENT EXTRACTION

RELATED APPLICATION

This application claims the benefit of U.S. Provisional Application No. 61/264,270, filed Nov. 25, 2009, the entire content of which is incorporated herein by reference.

BACKGROUND

In this century, the shortage of fresh water is expected to surpass the shortage of energy as a global concern for humanity, and these two challenges are inexorably linked. Fresh water is one of the most fundamental needs of humans and other organisms. Each human needs to consume a minimum of about two liters per day in addition to greater fresh-water demands from farming as well as from industrial processes. Meanwhile, techniques for transporting fresh water or for producing fresh water via desalination tend to be highly demanding of increasingly scarce supplies of affordable energy.

The hazards posed by insufficient water supplies are particularly acute. A shortage of fresh water may lead to famine, disease, death, forced mass migration, cross-region conflict/war (from Darfur to the American southwest), and collapsed ecosystems. In spite of the criticality of the need for fresh water and the profound consequences of shortages, supplies of fresh water are particularly constrained. 97.5% of the water on Earth is salty, and about 70% of the remainder is locked up as ice (mostly in ice caps and glaciers), leaving only 0.75% of all water on Earth as available fresh water.

Moreover, that 0.75% of available fresh water is not evenly distributed. For example, heavily populated developing countries, such as India and China, have many regions that are subject to scarce supplies. Further still, the supply of fresh water is often seasonally inconsistent. Typically confined to regional drainage basins, water is heavy and its transport is expensive and energy-intensive.

Meanwhile, demands for fresh water are tightening across the globe. Reservoirs are drying up; aquifers are falling; rivers are dying; and glaciers and ice caps are retracting. Rising populations increase demand, as do shifts in farming and increased industrialization. Climate change poses even more threats in many regions. Consequently, the number of people facing water shortages is increasing.

Massive amounts of energy are typically needed to produce fresh water from seawater (or to a lesser degree, from brackish water), especially for remote locations. Reverse osmosis (RO) is currently the leading desalination technology, but it is energy intensive and still relatively inefficient due to the large pressures required to drive water through semi-permeable membranes and their tendency for fouling. In large-scale plants, the energy/volume required can be as low as 4 kWh/m$^3$ at 30% recovery, compared to the theoretical minimum around 1 kWh/m$^3$, although smaller-scale RO systems (e.g., aboard ships) have much worse efficiency, by an order of magnitude. Another popular method is the multi-stage flash (MSF) distillation, also an energy and capital intensive process.

Rather than extracting pure water, electrochemical methods, such as electrodialysis (ED) and capacitive desalination (CD), extract just enough salt to achieve potable water (<10 mM). Current large-scale electrochemical desalination systems are less efficient than RO plants at desalinating seawater (e.g., 7 kWh/m$^3$ is the state of the art in ED), but become more efficient for brackish water (e.g., CD can achieve 0.6 kWh/m$^3$). In general, existing techniques for removing salt from water, some of which have existed for centuries, tend to be expensive or complicated or both.

SUMMARY

Methods and apparatus for water desalination using directional solvent extraction are described herein. Various embodiments of the apparatus and method may include some or all of the elements, features and steps described below.

Certain solvents, such as edible oils (e.g., soybean oil) and some fatty acids, possess an unusual characteristic of being able to directionally dissolve water while not dissolving other water-soluble salts, such as sodium chloride, or impurities and while being insoluble or almost insoluble in water (i.e., water dissolves into the majority directional solvent phase, but the directional solvent does not dissolve into the majority water phase by more than trace amounts). This directional-solubility phenomenon is exploited, herein, in a new method of temperature-controlled desalination of a saline solution.

In an example of the method, a saline solution (e.g., sea water) is brought into contact with a directional solvent. The directional solvent can include a carboxylic acid (i.e., a compound that includes a carboxyl group, R—COOH), such as decanoic acid, $CH_3(CH_2)_8COOH$. The saline solution and solvent are heated before or after contact to enhance the directional dissolution of water into the solvent and to thereby produce distinct phases, a first phase that includes the solvent and water from the saline solution and a second phase that includes a highly concentrated remainder of the saline solution. The first phase separates from the second phase and is extracted. Alternatively, the second phase can be extracted from the first phase. After extraction, the first phase is cooled to precipitate the water from the solvent; and the precipitated water is then removed from the solvent. The extracted water can be in the form of substantially pure water (e.g., suitable for industrial or agricultural use or even meeting drinking-water standards of purity, such as 99.95% purity).

The methods of this disclosure can use low-quality heat, which can come from terrestrial heat sources, from the ocean, from the sun, or as waste heat from other processes. These desalination methods can also be easy to use and can offer significant energy and economic savings over present desalination methods.

BRIEF DESCRIPTION OF THE DRAWINGS

In the accompanying drawings, like reference characters refer to the same or similar parts throughout the different views. The drawings are not necessarily to scale, emphasis instead being placed upon illustrating particular principles, discussed below.

DETAILED DESCRIPTION

Figure 1:
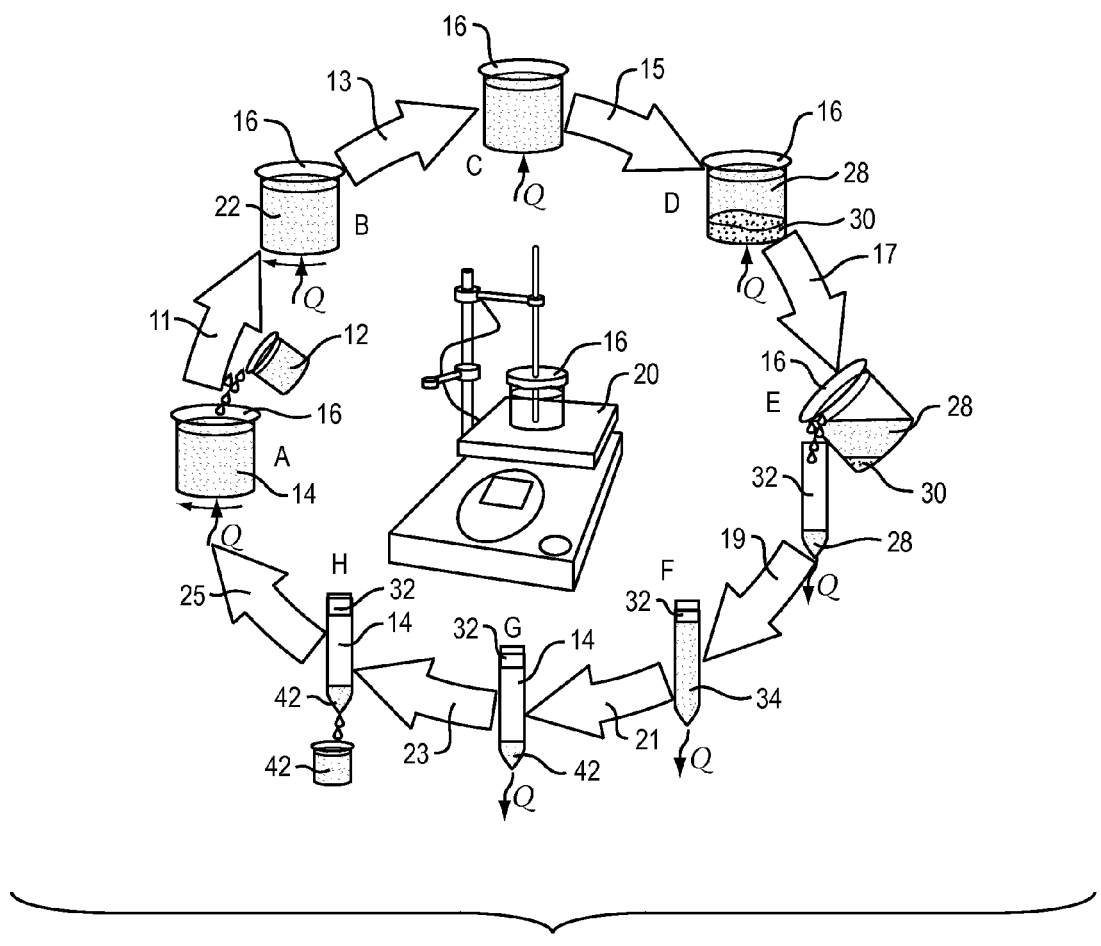
FIG. 1 is a schematic illustration of a directional solvent extraction desalination process, at lab scale.

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, terms (including technical and scientific terms) used herein have the same meaning as commonly understood by one of ordinary skill in the art to which this invention belongs. It will be further understood that terms, such as those defined in commonly used dictionaries, are to be interpreted as having a meaning that is consistent with their meaning in the context of the relevant art and are not to be interpreted in an idealized or overly formal sense unless expressly so defined herein. For example, if a particular composition is referenced, practical, imperfect realities may apply; e.g., the potential presence of at least trace impurities (e.g., at less than 0.1% by weight or volume) can be understood as being within the scope of the description.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "upper," "beneath," "below," "lower," and the like, may be used herein for ease of description to describe the relationship of one element to another element, as illustrated in the figures. It will be understood that the spatially relative terms are intended to encompass different orientations of the apparatus in use or operation in addition to the orientation depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, the singular forms "a," "an" and "the" are intended to include the plural forms as well, unless the context clearly indicates otherwise. Additionally, the terms, "includes," "including," "comprises" and "comprising," specify the presence of the stated elements or steps but do not preclude the presence or addition of one or more other elements or steps.

A batch, lab-scale exemplification of a desalination process is broadly and schematically illustrated in FIG. 1 with various stages shown in greater detail in FIGS. 2-9. The process can also be carried out on a larger, industrial scale using larger, automated apparatus. Moreover, the process can also be conducted in a continuous, staged process, where the saline solution is continuously input and substantially pure water is continuously output.

The process of FIG. 1 commences at stage A with the addition of a saline solution 12 and heat, Q, to a directional solvent 14 in a container 16. The directional solvent 14 and saline solution 12 are mixed 11 to produce an emulsion 22, as shown in stage B. With the addition of more heat, Q, water from the saline solution then dissolves 13 into the directional solvent through stage C; and the concentrated remainder 30 of the saline solution settles 15 to the bottom of the container 16 into stage D.

The container 16 is then removed from the heat source and the solution of water in the directional solvent is decanted 17 from the container into a secondary vessel in stage E and left to cool to precipitate 19 water from the solution, as shown in stage F. The precipitated water settles 21 to the bottom of the vessel in stage G and is then recovered 23 as substantially pure water from the bottom of the vessel in stage H. As shown, the directional solvent can then be reused 25 as the process is repeated with additional saline solution.

Figure 2:
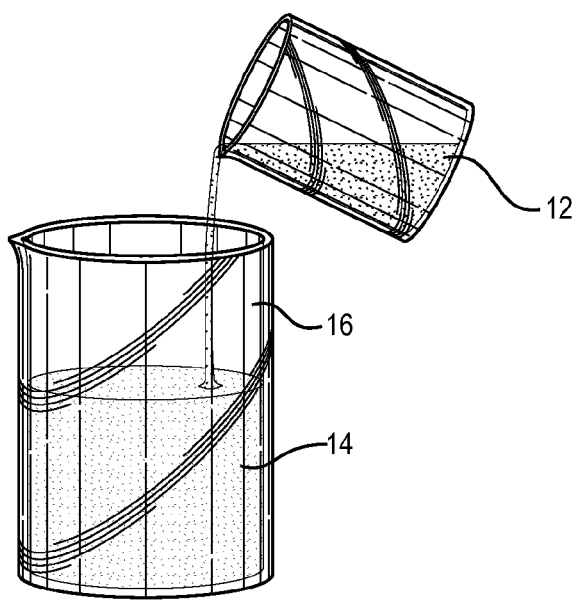
FIG. 2 is an illustration of an initial stage in the process, wherein saline water is mixed with a directional solvent.

Revisiting the steps of this process from the beginning in a more-specific example, starting with FIG. 2 (stage A in FIG. 1), a saline solution 12 is added to a container (e.g., a beaker) 16 filled with a directional solvent 14 at or near room temperature (e.g., 25-35° C.). The saline solution 12 can be naturally occurring—for example, in the form of saline water extracted from the sea. The directional solvent 14 can be, for example, an edible oil, such as soybean oil, palm oil, rapeseed oil, coconut oil or linseed soil, that includes fatty acids. Alternatively, the directional solvent can consist essentially of one or more select fatty acids. Suitable fatty acids can include carbon chains of, for example, 6 to 13 carbon atoms, such as decanoic acid, which has a carbon chain length of 10 carbon atoms. The fatty acid can also be a solid at room temperature (e.g., at about 30° C. and/or below). Decanoic acid is considered substantially insoluble in water (e.g., dissolving in water up to only about 40-50 parts per million); and decanoic acid is relatively harmless to humans, as it is naturally found in milk.

In the methods for separating water from a saline solution, a hydrophilic hydroxide group from the fatty acid may bind to water from the saline solution.

Figure 3:
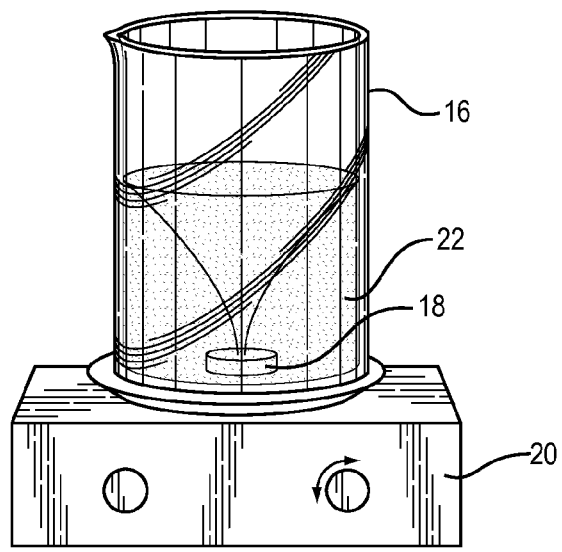
FIG. 3 is an illustration showing the use of a stirring plate to stir the mixture of the saline water and solvent to create an emulsion.

The container 16 with the combined saline solution 12 and the directional solvent 14 are then mixed to form an emulsion. As shown in FIG. 3 (stage B in FIG. 1), in a lab-scale setting, mixing can be carried out on a magnetic stirring plate 20 with a magnetic stirrer 18 dropped into the container 16. The stirring plate 20 magnetically displaces the magnetic stirrer 18 in the container 16 to vigorously mix the solvent 14 and saline solution 12 to produce an emulsion 22 of the two liquids. Mixing is conducted until the emulsion 22 appears cloudy to the eye (e.g., in this embodiment, for about 30 seconds).

Figure 4:
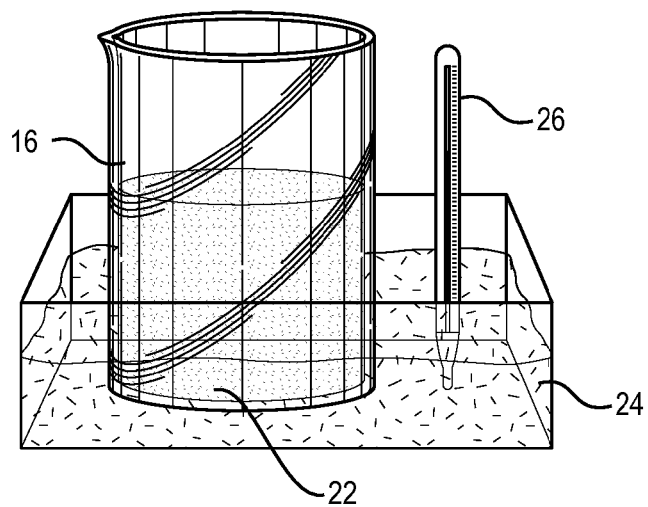
FIG. 4 is an illustration showing immersion of the emulsion in a hot-water bath to raise the temperature of the emulsion.

The emulsion 22 in the container 16 is exposed a heat source 24 (e.g., in the form of a hot water bath), as shown in FIG. 4 (stage C in FIG. 1), and preheated up to a preheat temperature of, for example, about 75° C. or, in other embodiments, only to a temperature as low as about 40° C., with the elevated temperature reflected by the elevated mercury in the illustrated thermometer 26. Alternatively, the solvent 14 and/or saline solution 12 can be heated before contact or mixing. The heat can be provided, e.g., by waste heat from another process or from terrestrial heat sources, from the ocean, or from simple solar heating from the sun. The emulsion 22 remains subjected to the heat source to maintain the preheat temperature (e.g., for a day) to allow water from the saline solution droplets in the emulsion 22 to dissolve into the directional solvent.

Figure 5:
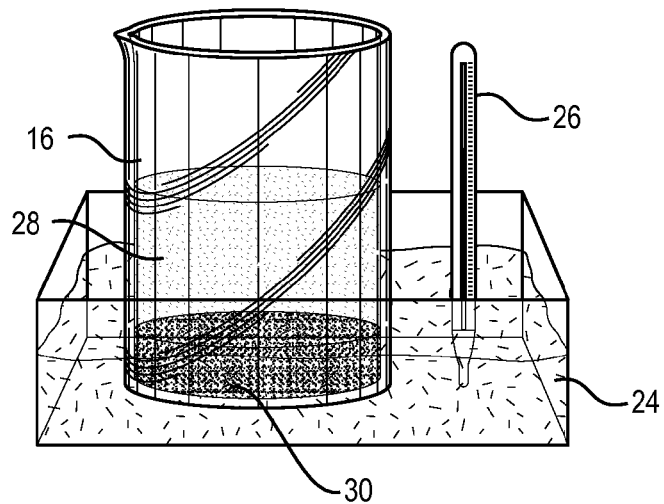
FIG. 5 is an illustration showing separation of the heated emulsion into a top layer of solvent with dissolved water and a bottom layer of highly concentrated saline water.

The solution 28 of the solvent with the dissolved water rises to the top of the container 16 and appears clear to the eye, while the concentrated remainder 30 of the saline solution separates to the bottom of the container 16, as shown in FIG. 5 (stage D in FIG. 1).

Figure 6:
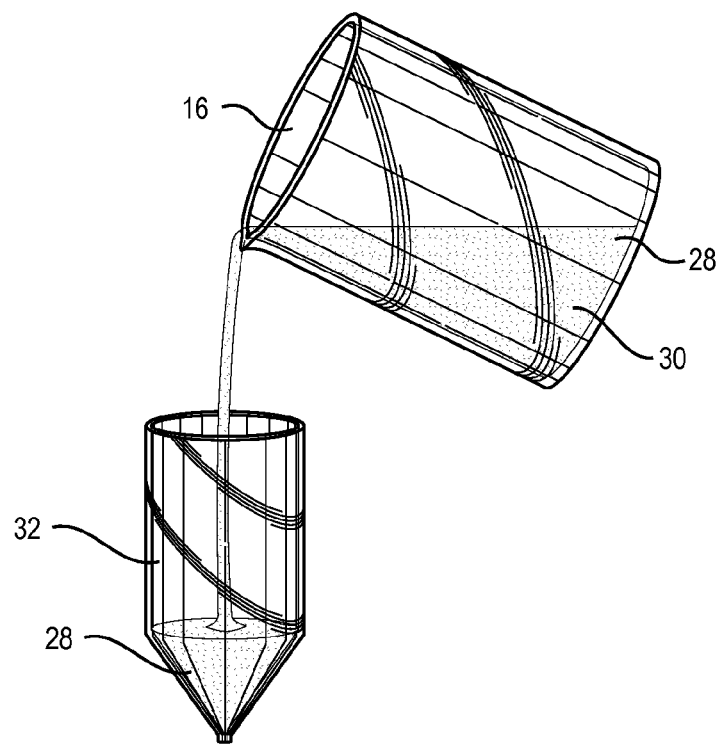
FIG. 6 is an illustration showing decantation of the top layer of solvent and dissolved water into a tube.
Figure 7:
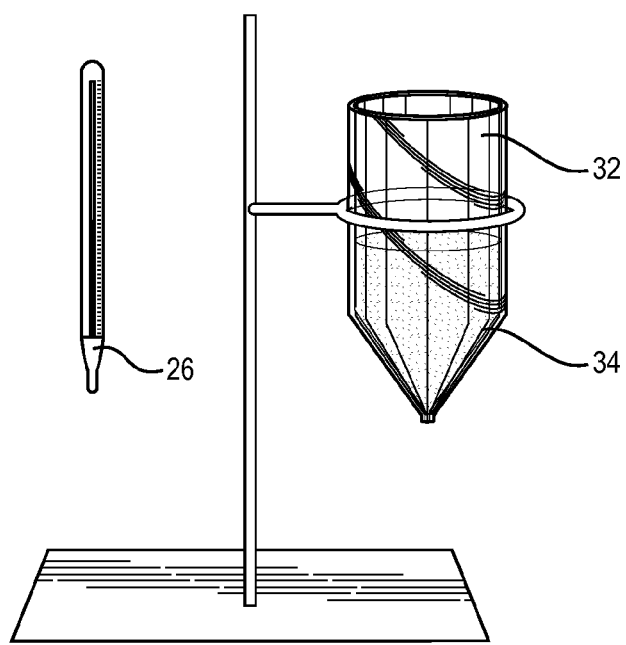
FIG. 7 is an illustration showing the cooling of the decanted solvent and dissolved water to precipitate small droplets of water from the solvent.

The container 16 is then removed from the heat source 24 and the solution 28 including the solvent and the dissolved water is decanted from the container 16 into secondary vessels 32 (e.g., in the form of conical tubes), as shown in FIG. 6 (stage E in FIG. 1), and left to cool (e.g., in ambient air) back to room temperature, as shown in FIG. 7 (stage F in FIG. 1). As the solution 28 cools, the solution 28 turns cloudy, indicating the precipitation of small droplets of water to form an emulsion 34.

Figure 8:
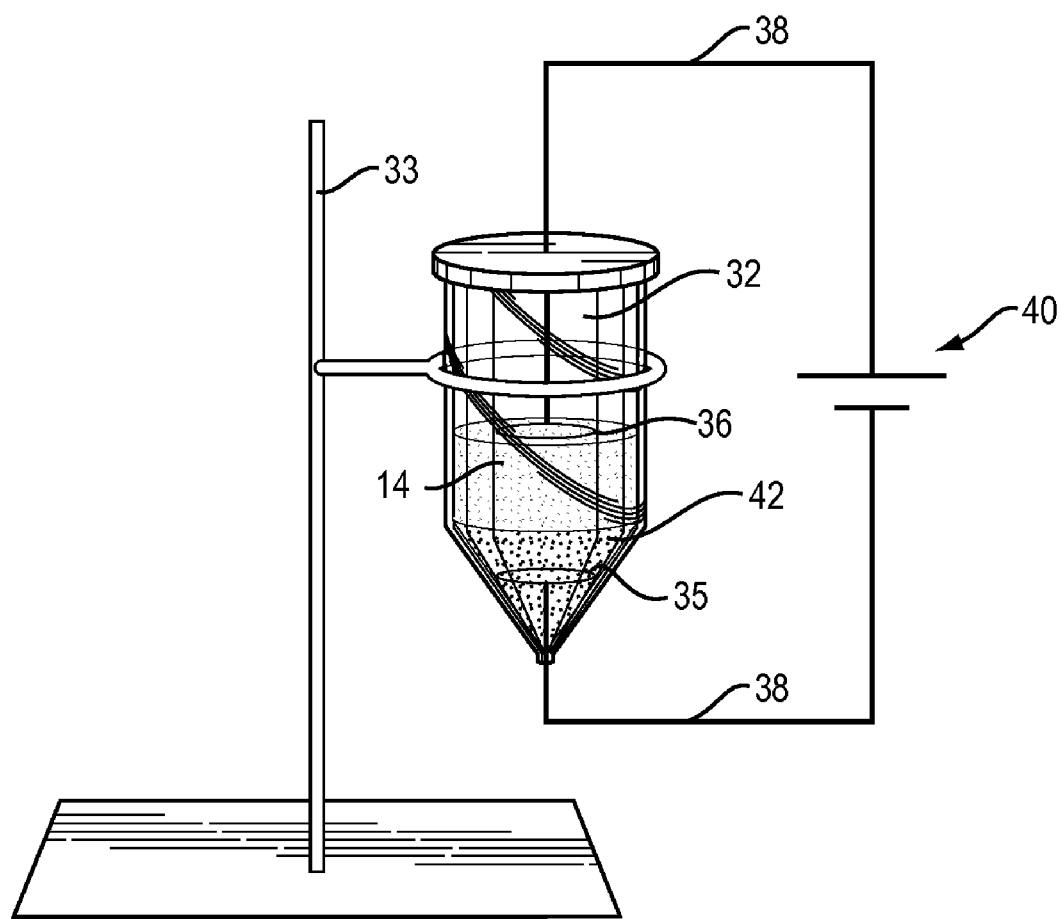
FIG. 8 is an illustration showing the use of dielectrophoresis to separate the droplets of water from the solvent, with the separated water collecting at the bottom of the tube.
Figure 9:
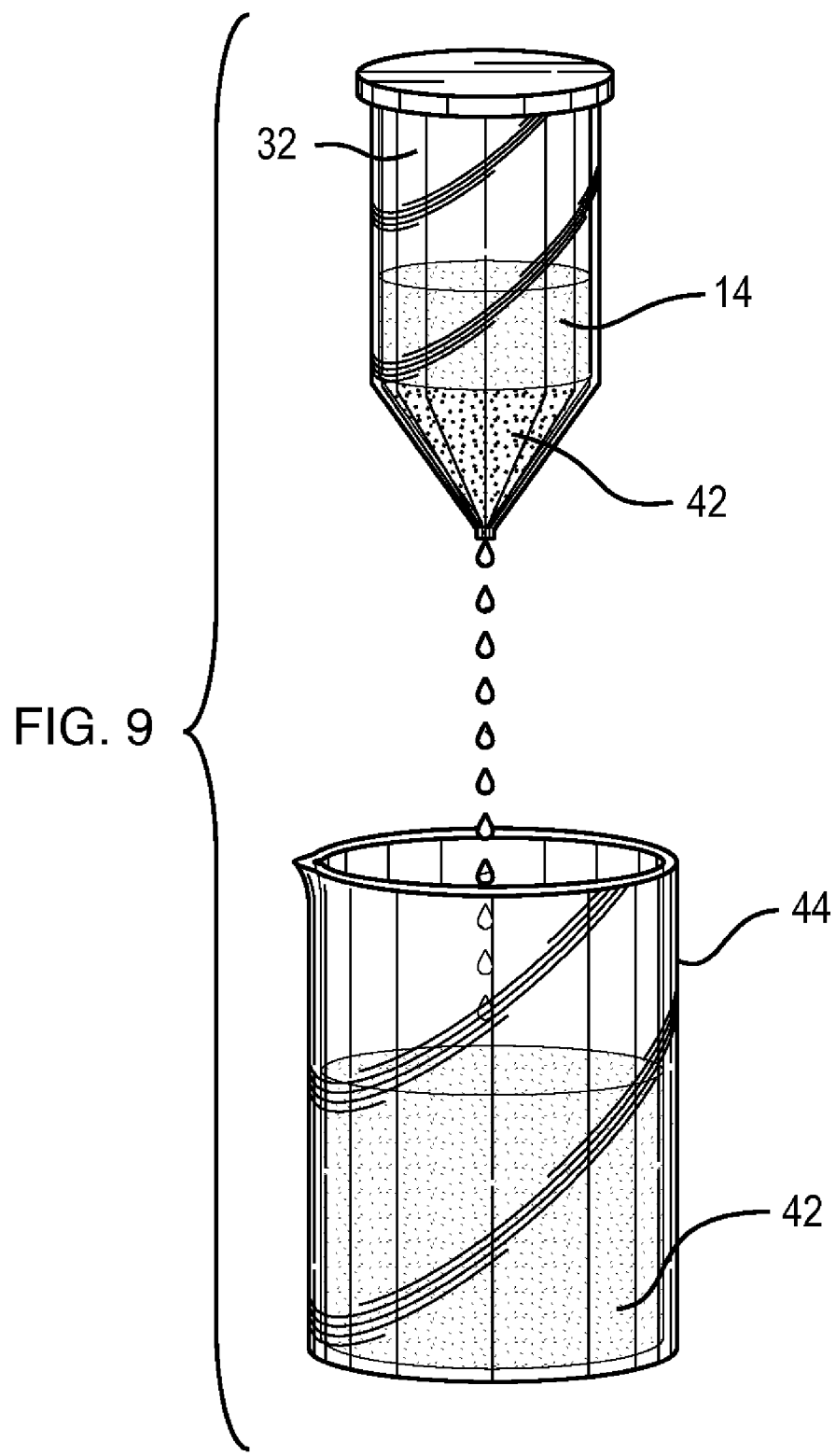
FIG. 9 is an illustration showing the recovery of substantially pure water from the bottom of the tube.

Optionally, to expedite separation of the precipitated water and separation of the water from the solvent, the emulsion 34 of the precipitated water and solvent, while held in the tube 32 in a stand 33, can be subject to dielectrophoresis, as shown in FIG. 8 (stage G in FIG. 1). As shown, a power supply 40 is coupled via conductive wires 38 to a pair of electrodes 35 and 36 positioned at the bottom and top of the vessel 32. The power supply 40 produces a potential difference across the electrodes 35 and 36, wherein the non-uniformity of the electrode shape (e.g., a flat plate at one end and a needle at the other end) produces a non-uniform electric field that acts on the water droplets to separate them from the solvent. Consequently, substantially pure water 42, which has a greater density than the solvent, is collected at the bottom of the vessel 32 and removed via a hole in the bottom of the vessel and collected in a water reservoir 44 (in this embodiment, in the form of a beaker), as shown in FIG. 9 (stage H in FIG. 1).

The substantially pure water 42 can have a weight-to-weight salt content of, e.g., less than 1.5%, less than 0.14%, or less than 0.05%. Optionally, an additional desalination can be employed after the above-described water-separation methods to reach a higher level of water purity. For example, a second stage of desalination can be in the form of reverse osmosis or flash distillation.

In large systems, heat recuperation may be used to improve the system efficiency. For example, heat released in cooling to precipitate out pure water can be used for heating up the salt-water-in-oil emulsion.

One application for these apparatus and methods is in petroleum oil or natural gas production, wherein the directional solvent can be used to separate salts and other components that are insoluble in the directional solvent from, for example, "produced water" (i.e., water that is produced along with the oil and gas) or "fracking water" (i.e., water from hydraulic fracturing) that is generated, in particular, when extracting oil from tar sands or when extracting natural gas from shale. The fracking water can have a salt concentration three times as great as that of typical sea water and can include, for example, benzene and heavy metals. And typically, the produced water or fracking water is transported offsite for treatment and/or containment in above-ground pools.

Both reverse osmosis and multi-stage flash exhibit lower performance in produced or fracking water treatment, where a much higher salinity in the produced or fracking water increases energy consumption and causes increased membrane fouling. By instead mixing the produced water with the directional solvent, most of the water can be extracted in substantially pure form using relatively low energy and heat inputs and at a reasonable cost, leaving a much more concentrated and lower volume waste product and allowing the extracted water to be reused in the oil extraction process, thereby offering substantial environmental benefits in terms of waste containment, lower water demands, less environmental pollution and greater efficiency.

Exemplification 1

Materials, Methods, and Observations

In a first experiment, soybean oil was used as the directional solvent. Soybean oil has a water saturation limit of 0.3% by volume at 25° C., and this saturation limit is expected to nearly double at 60° C. Soybean oil is inexpensive and readily available.

An aqueous solution of sodium chloride was prepared to simulate sea water. The salt content of this solution was measured using a Horiba Salt Meter and was found to be 3.367%±0.115%.

About 6 ml of this salt solution were added to about 300 ml of soybean oil and mixed vigorously in a container on a stirring plate to produce an emulsion of salt solution in oil. The mixture was stirred for about 30 seconds until the contents of the container appeared cloudy to the eye.

This emulsion container was then placed in a hot water bath preheated to 75° C. The emulsion was left in the hot water bath for 24 hours (this incubation period may readily be decreased or increased to optimize processing speed or output) to allow some water from the emulsion droplets to dissolve into the oil. This directional dissolution of water into the oil is expected to render the remaining droplets highly concentrated with salt, and these droplets are expected to separate under gravity to the bottom of a container.

After 24 hours of incubation, the emulsion container was taken out of the hot water bath. As expected, a significant amount of the salt solution had separated to the bottom of the container, and the oil above appeared clear to the eye. This change from cloudy to clear indicates that the emulsion droplets either dissolved, or separated to the bottom of the container.

The oil above the separated salt solution was decanted into six different 50 ml conical tubes and left to cool in air at room temperature. As expected, after several hours of cooling down, the oil appeared to turn cloudy again, indicating the precipitation of small droplets of water.

To expedite the process of separation of this precipitated water and its separation from oil, the emulsions were subjected to dielectrophoresis. In the dielectrophoresis process, a non-uniform electric field was used to separate particulates (here, water droplets) from a host fluid (here, oil). Specifically, the mixture was subjected to an electric field of about 2 kV/cm for about 5 minutes. Significant separation of water from oil was observed. This separated and seemingly desalinated water was removed by a hole in the bottom of the conical tubes. About 1.5 ml of water was recovered.

The recovered water was also tested using the Horiba Salt Meter and the final salt content was found to be 0.5833%±0.0681%.

Discussion:

As expected, the salt content of the initial salt solution was significantly reduced using the demonstrated process.

Even though the final salt concentration was significantly less than the initial concentration, it is not at drinking standards of 0.05%. The remaining salt in the recovered water is attributed to the possibility that not all the undissolved water that contained salt was separated before decantation and eventually mixed with the pure water. The salt content can be reduced by subjecting the mixture to dielectrophoresis before cooling to enhance the separation of micro-droplets of emulsified highly salty water and thus reduce further the final salt concentration of the recovered water. Alternatively, even with such a salt content, this process can be used as a first (pre-treatment) stage of desalination, in combination with, for example, the use of membrane-based water-separation technology in a subsequent second stage. In this context, this first-stage desalination process reduces the energy and cost needed for producing high-purity water in the second-stage process.

Another area for improvement was the small volume of pure water that was recovered; the recovered pure water was only about 0.5% of the volume of oil used. This limited recovery could make the process energy inefficient as well as size inefficient. To address this concern, other directional solvents, such as decanoic acid, that are capable of dissolving larger amounts of water can be used.

Despite these areas that may be targeted for improvement, the results of this experiment were viewed as being extremely promising; and it was believed that this method with the contemplated modifications could yield pure water while still maintaining energy and size efficiencies.

Exemplification 2

In an attempt to discover a more efficient process, a second experiment was conducted, wherein the above-described experiments were repeated using decanoic acid as the solvent. Decanoic acid dissolves about 3.4% water (i.e., such that the solution includes about 3.4% dissolved water) at 33° C. and about 5.1% water at 62° C. Pure decanoic acid is a solid below 30° C.

Figure 10:
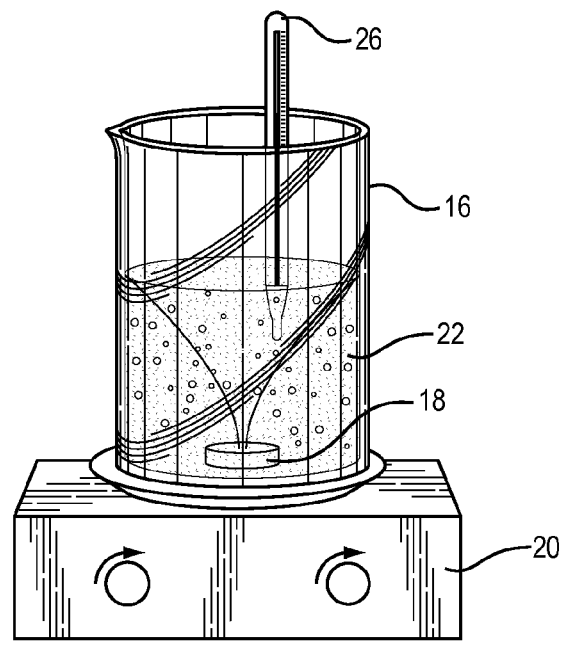
FIG. 10 is an illustration showing the use of a stirring plate to stir a mixture of saline water and decanoic acid solvent to create a heated emulsion.
Figure 11:
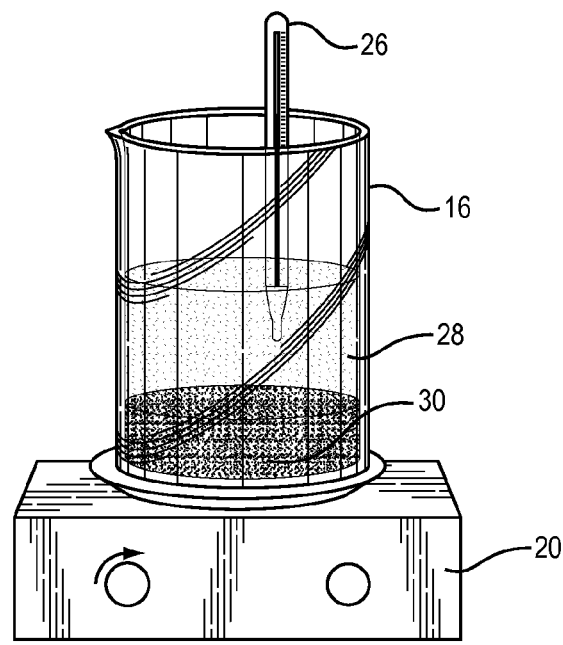
FIG. 11 is an illustration showing the separation of the heated emulsion into a top layer of decanoic acid with dissolved water and a bottom layer of highly concentrated saline water.

The decanoic acid was initially heated slightly (to about 30° C.) to melt it before the saline solution was added, and the stirring plate 20 was heated to heat the mixture (as shown by thermometer 26 reflecting an elevated temperature) when forming the emulsion 22, as shown in FIG. 10. After stirring, the emulsion was allowed to stand on the heating/stirring plate 20 to allow for separation of the solvent and dissolved water solution 28 from the highly concentrated remainder of the saline solution 30, as shown in FIG. 11.

Figure 12:
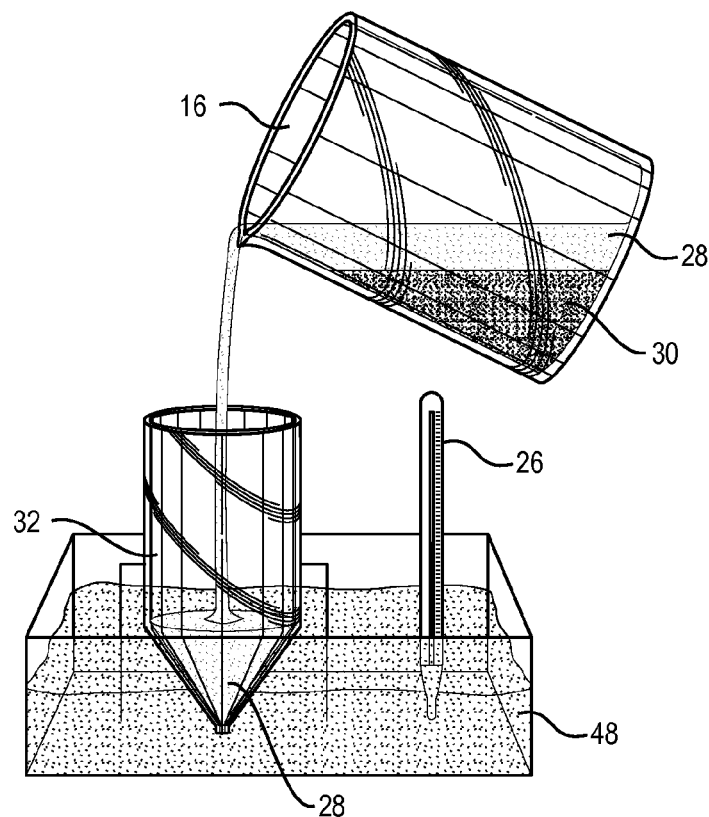
FIG. 12 is an illustration showing decantation of the top layer of solvent and dissolved water into a tube heated in a bath of hot water.
Figure 13:
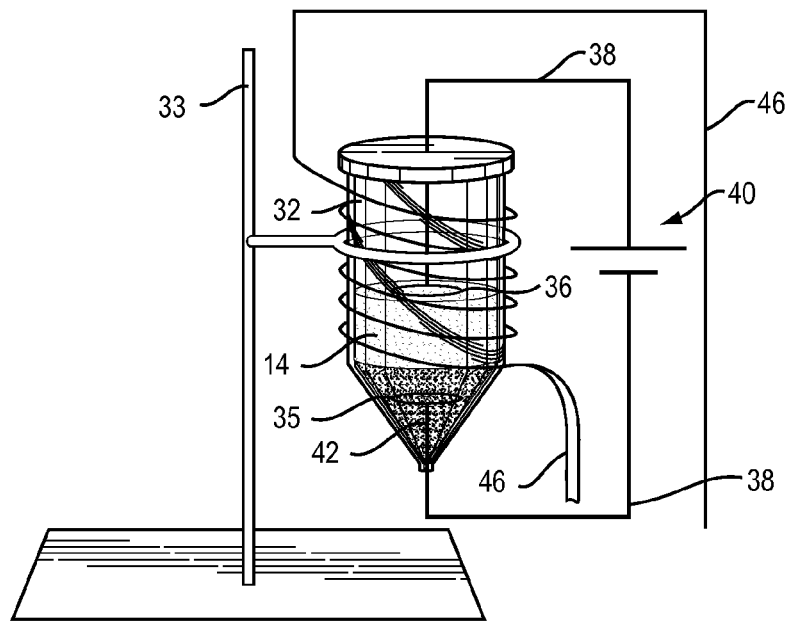
FIG. 13 is an illustration showing the use of dielectrophoresis in a heated tube to separate the droplets of water from the solvent, with the separated water collecting at the bottom of the tube.
Figure 14:
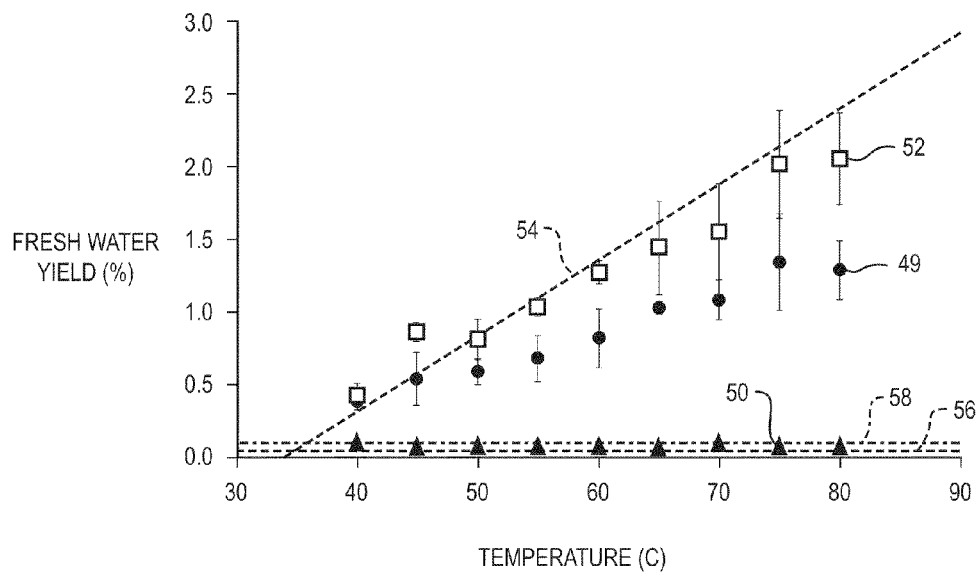
FIG. 14 is a chart plotting fresh water yield from decanoic acid solvent as a function of temperature.

Thereafter, the phase containing decanoic acid and dissolved water solution 28 was transferred to conical tubes 32 placed in a water bath 48, as shown in FIG. 12, where the contents were allowed to cool and stand for several hours before final separation of substantially pure water. Next, as shown in FIG. 13, heating was provided via a resistive heating coil 46 during dielectrophoresis to keep the decanoic acid above 30° C. to prevent solidification. Finally, the substantially pure water 42, which has a greater density than the decanoic acid, is collected at the bottom of the vessel 32 and removed via a hole in the bottom of the vessel 32 and collected in a water reservoir 44, as shown in FIG. 9. This second experiment included experimental runs in which emulsion was heated to temperatures of 40, 45, 50, 55, 60, 65, 70, 75, and 80° C. Starting with an initial salt content of 3.5% weight in weight (w/w), the desalinated water contained between 0.06% and 0.11% salt with a yield between 0.4% w/w and 2% w/w of desalinated water from the emulsion (wherein yield is the weight of water recovered divided by the unit weight of solvent used), depending on the top operating temperature. Thus, not only is this solvent considerably more efficient (than soybean oil, as used in the first experiment), the salt removal is also much more effective with decanoic acid. The salinity of the recovered water is in the range of agricultural and drinking water standards. FIG. 14 summarizes the results, wherein the yields (circles) 49 and recovered water salinities (triangles) 50 from different experimental runs are plotted. Also plotted are experimental yields (squares) 52 when pure water was dissolved into decanoic acid. The dashed line 54 reflects calculated yield from solubility data from C. Hoerr, et al., "The Effect of Water on Solidification Points of Fatty Acids," *Journal of the American Oil Chemists' Society*, Vol. 19, 126-128 (1942). Finally, the EPA salinity limit is shown as the dot-dash line 56 at the bottom of the chart, with the WHO salinity plotted as a second dot-dash line 58 just above it.

Additionally, another benefit of using decanoic acid as a solvent is that decanoic acid is a solid below 30° C., and thus if any solvent is left behind in the recovered water as an impurity, it may be easily removed by cooling the mixture below 30° C. and separating the water from the solid impurities.

Figure 15:
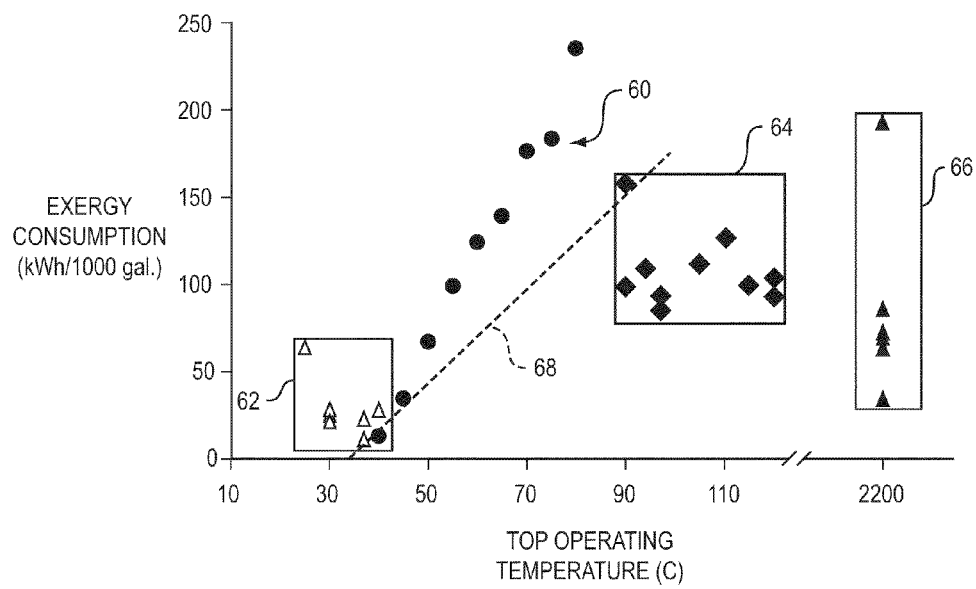
FIG. 15 is a chart plotting exergy consumption for a desalination process using decanoic acid as a solvent as a function of temperature.

Exergy consumption was calculated for an industrial desalination process using decanoic acid as the directional solvent and is summarized in FIG. 15, where exergy consumption from experimental results (circles) 60 at the preheat temperatures of 40, 45, 50, 55, 60, 65, ° C., 70° C., 75, and 80° C., are compared with literature values for exergy consumption of reverse osmosis (hollow triangles) 62 and multi-stage flash (diamonds) 64. These plots of exergy consumption represent the maximum amount of electric work equivalent used to remove the salt from seawater. Also depicted is the actual source temperature exergy consumption of reverse osmosis (filled triangles) 66 given that the electricity is derived from a power plant at high temperatures. To extrapolate experimental results to numbers for a continuous industrial process, a heat exchanger efficiency of 80% was assumed. The energy to work conversion for the proposed process was done at Carnot efficiency, which is the theoretical maximum achievable using a heat engine. In reality, no heat engine is effective at the low operating temperatures used here, and the actual electric work equivalents would be much lower than those calculated. The dashed line 68 again is based on exergy consumption calculated from the solubility data from C. Hoerr, et al., "The Effect of Water on Solidification Points of Fatty Acids," *Journal of the American Oil Chemists' Society*, Vol. 19, 126-128 (1942).

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/100^{th}$, $1/50^{th}$, $1/20^{th}$, $1/10^{th}$, $1/5^{th}$, $1/3^{rd}$, $1/2$, $3/4^{th}$, etc. (or up by a factor of 2, 5, 10, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references optionally may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A method for separating water from a saline solution using a directional solvent, the method comprising:
    providing a directional solvent comprising a fatty acid and providing a saline solution comprising water and at least one salt at an initial salt concentration;
    making an emulsion of the saline solution in the directional solvent in liquid form;
    heating the directional solvent before or after contact with the saline solution to produce a first phase that includes the directional solvent and a concentration of water from the saline solution dissolved in the directional solvent, and a second phase that includes a highly concentrated remainder of the saline solution;
    allowing the first phase to separate from the second phase;
    extracting the first phase including the directional solvent and the dissolved water from the highly concentrated remainder of the saline solution or extracting the highly concentrated remainder of the saline solution from the first phase;
    cooling the first phase after extraction to precipitate the water from the directional solvent, wherein the directional solvent is maintained in liquid form as the water is precipitated, wherein the water is precipitated with a salt concentration substantially less than the initial salt concentration of the saline solution, and wherein the concentration of water that dissolves in the directional solvent is at least 10 times greater than the concentration of the directional solvent in the precipitated water; and
    removing the precipitated water from the directional solvent.

2. The method of claim 1, wherein the fatty acid includes a carbon chain with a length from 6 to 13 carbon atoms.

3. The method of claim 1, wherein the directional solvent is a solid at temperatures of 30° C. and below.

4. The method of claim 1, further comprising mixing the directional solvent and the saline solution to produce the emulsion before heating the directional solvent and saline solution.

5. The method of claim 1, further comprising mixing the directional solvent and the saline solution to produce the emulsion after heating the directional solvent.

6. The method of claim 1, further comprising using dielectrophoresis to separate the precipitated water from the directional solvent.

7. The method of claim 1, wherein the directional solvent is heated using energy from a mid-temperature heat source of no greater than 75° C.

8. The method of claim 1, wherein the directional solvent is heated using energy from a low-temperature heat source of no greater than 40° C.

9. The method of claim 1, wherein the directional solvent and the saline solution are heated using heat from another process or using terrestrial or solar heat.

10. The method of claim 1, wherein the extracted precipitated water has a weight-to-weight salt content of less than 1.5%.

11. The method of claim 1, wherein the extracted precipitated water has a weight-to-weight salt content of less than 0.14%.

12. The method of claim 1, wherein the extracted precipitated water has a weight-to-weight salt content of less than 0.05%.

13. The method of claim 1, wherein separation of the water from the saline solution using the directional solvent is a first stage in a multi-stage desalination process, the method further comprising subjecting the precipitated water, after extraction, to a second stage of desalination to reach a higher level of purity.

14. The method of claim 13, wherein the second stage of desalination includes reverse osmosis or flash distillation.

15. The method of claim 1, further comprising reusing the directional solvent to repeat the method of separating water from saline solution.

16. The method of claim 1, wherein the water from the saline solution dissolves into the directional solvent at a concentration of at least about 1 volume-% of the directional solvent.

17. The method of claim 1, wherein the water is precipitated from the directional solvent at a volume of at least about 0.5% of the volume of the directional solvent.

18. The method of claim 1, wherein the salt concentration in the precipitated water is less than half of the initial salt concentration.

19. The method of claim 1, wherein the salt concentration in the precipitated water is less than a fifth of the initial salt concentration.

20. The method of claim 1, wherein the water is precipitated with a directional-solvent content of 0 to about 0.3 volume %.

* * * * *